United States Patent
Nakajima

(10) Patent No.: US 7,697,180 B2
(45) Date of Patent: Apr. 13, 2010

(54) LIGHT DEFLECTOR, OPTICAL SCANNER, AND IMAGE FORMING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 584 days.

(21) Appl. No.: 11/561,702

(22) Filed: Nov. 20, 2006

(65) Prior Publication Data

US 2007/0146856 A1    Jun. 28, 2007

(30) Foreign Application Priority Data

Nov. 21, 2005  (JP)  ............................. 2005-336404
Aug. 3, 2006   (JP)  ............................. 2006-212643

(51) Int. Cl.
    *G02B 26/08*   (2006.01)
(52) U.S. Cl. ............... 359/199.1; 359/213.1; 359/214.1
(58) Field of Classification Search ... 359/198.1–199.1, 359/213.1–214.1
    See application file for complete search history.

(56) References Cited

U.S. PATENT DOCUMENTS

| 6,932,271 | B2 | 8/2005 | Nakajima et al. |
| 6,995,885 | B2 | 2/2006 | Nakajima |
| 2002/0122217 | A1 | 9/2002 | Nakajima |
| 2004/0036936 | A1 | 2/2004 | Nakajima et al. |
| 2005/0088512 | A1 | 4/2005 | Nomura et al. |
| 2005/0185237 | A1 | 8/2005 | Nakajima |

FOREIGN PATENT DOCUMENTS

| EP | 1 669 790 A1 | 6/2006 |
| JP | 63-43172 | 2/1988 |
| JP | 2924200 | 5/1999 |
| JP | 3011144 | 12/1999 |
| JP | 3049606 | 3/2000 |
| JP | 2002-258183 | 9/2002 |
| JP | 3445691 | 6/2003 |
| JP | 3543473 | 4/2004 |

OTHER PUBLICATIONS

U.S. Appl. No. 11/765,166, filed Jun. 19, 2007, Nakajima.
U.S. Appl. No. 12/051,404, filed Mar. 19, 2008, Amada, et al.
U.S. Appl. No. 12/028,446, filed Feb. 8, 2008, Nakamura, et al.

*Primary Examiner*—James Phan
(74) *Attorney, Agent, or Firm*—Oblon, Spivak, McClelland, Maier & Neustadt, L.L.P.

(57) ABSTRACT

A light deflector is disclosed that includes a movable mirror serving as a deflector supported by a rotary shaft and configured to deflect a light beam emitted from a light source and scan an area to be scanned; a rotation part configured to cause the movable mirror to vibrate in a reciprocating manner by periodically applying a rotational torque to the movable mirror; a driving circuit configured to control the rotation part; a circuit board having the driving circuit provided thereon, the circuit board being configured to support the movable mirror as a unit; a contact plane contacting the circuit board in a plane perpendicular to the rotary shaft of the movable mirror; and a positioning part configured to determine the position of the rotary shaft in the contact plane.

8 Claims, 15 Drawing Sheets

LIGHT DEFLECTOR, OPTICAL SCANNER, AND IMAGE FORMING APPARATUS

BACKGROUND OF THE INVENTION

1. Field of the Invention

The present invention relates to a light deflector, an optical scanner, and an image forming apparatus.

2. Description of the Related Art

In optical scanners used in conventional electrophotographic image forming apparatuses, polygon mirrors or galvanometer mirrors are used as light deflectors for light beam scanning. In order to achieve higher image resolution and perform printing at higher speed, these mirrors should be rotated at higher speed. However, there is a limit to an increase in the rotational speed of the mirror (scanning speed) for reasons such as bearing durability, heat generation due to windage, and noise.

On the other hand, recently, studies have been made of a light deflector using silicon micromachining. For example, Japanese Patent Nos. 2924200 and 3011144 disclose techniques for forming a vibrating mirror and torsion beams, serving as a shaft to support the vibrating mirror, as a unitary structure using a Si substrate.

According to these techniques, it is possible to miniaturize a mirror surface, and resonance is employed to cause the mirror to vibrate back and forth or in a reciprocating manner. Therefore, these techniques have the advantage of enabling high-speed operation with low noise and low power consumption. Further, since the mass of a movable part is reduced, it is also possible to keep banding due to vibration at low level.

Japanese Patent Nos. 3445691 and 3543473 disclose employment of a vibrating mirror in place of a polygon mirror.

However, in order to configure an optical scanner supporting a "tandem system" according to which a color image is formed by superposing images of different colors recorded on corresponding photosensitive body drums using vibrating mirrors, a vibrating mirror is required for each image forming station.

Further, each vibrating mirror is driven independently. Therefore, a difference in resonant frequency results in non-uniformity of the scan line pitch, so that the degree of misregistration of scan lines gradually increases between the start and the end of writing in the sub scanning direction. Further, if the vibrating mirrors are different in vibration center, the magnification in the area along the main scanning direction, that is, the dot distance, varies to cause misregistration or uneven density among superposed color images. This causes color misregistration or color change, thus degrading image quality.

Conventionally, in optical scanners using polygon mirrors, the misregistration as described above is periodically detected at the time of turning on an apparatus or an interval between jobs using detection patterns recorded on a transfer body as disclosed in Japanese Examined Patent Application Publication No. 7-19084 and Japanese Patent No. 3049606. Then, the misregistration is corrected by registering the positions of the first lines by synchronizing writing start timing at every other surface of each polygon mirror. As described above, however, simple replacement of the polygon mirrors, not to mention performing correction, cannot reduce color misregistration or color change.

Meanwhile, Japanese Laid-Open Patent Application No. 2002-258183 discloses a mirror driving method in the case of retaining disposition of multiple vibrating mirrors. According to this driving method, the vibrating mirrors are supported on a single base as a unit with their mirror surfaces being oriented in the same direction, and are driven by setting a common scanning frequency in the band excluding a resonant frequency.

As described above, the existing techniques have a problem in that mere replacement of polygon mirrors cannot reduce color misregistration or color change in the case of applying vibrating mirrors to an optical scanner supporting the "tandem system."

SUMMARY OF THE INVENTION

Embodiments of the present invention may solve or reduce one or more of the above-described problems.

According to one embodiment of the present invention, it is possible to stably maintain a scan position on a scanned surface and to keep good dispositional accuracy of each of multiple vibrating mirrors in combining the vibrating mirrors, so that it is possible to form a high-quality image.

According to one embodiment of the present invention, there is provided a light deflector including a movable mirror serving as a deflector supported by a rotary shaft and configured to deflect a light beam emitted from a light source and scan an area to be scanned; a rotation part configured to cause the movable mirror to vibrate in a reciprocating manner by periodically applying rotational torque to the movable mirror; a driving circuit configured to control the rotation part; a circuit board having the driving circuit provided thereon, the circuit board being configured to support the movable mirror as a unit; a contact plane contacting the circuit board in a plane perpendicular to the rotary shaft of the movable mirror; and a positioning part configured to determine a position of the rotary shaft in the contact plane.

According to one embodiment of the present invention, there is provided an optical scanner including a plurality of light sources each configured to emit a light beam; and a light deflector, the light deflector including a plurality of movable mirrors serving as deflectors each supported by a rotary shaft and configured to deflect the light beam emitted from a corresponding one of the light sources and scan an area to be scanned; a rotation part configured to cause the movable mirrors to vibrate in a reciprocating manner by periodically applying a rotational torque to the movable mirrors; a driving circuit configured to control the rotation part; a circuit board having the driving circuit provided thereon, the circuit board being configured to support the movable mirrors as a unit; a contact plane contacting the circuit board in a plane perpendicular to the rotary shafts of the movable mirrors; and a positioning part configured to determine a position of each of the rotary shafts in the contact plane, wherein the rotary shafts of the movable mirrors are disposed so as to be apart from each other by a predetermined distance in a direction perpendicular to a main scanning direction; and the movable mirrors deflect the light beams emitted from the corresponding light sources in opposite directions so as to scan the corresponding areas to be scanned.

According to one embodiment of the present invention, there is provided an optical scanner including a plurality of light sources each configured to emit a light beam; and a light deflector, the light deflector including a plurality of movable mirrors serving as deflectors each supported by a rotary shaft common to the movable mirrors and configured to deflect the light beam emitted from a corresponding one of the light sources and scan an area to be scanned; a rotation part configured to cause the movable mirrors to vibrate in a reciprocating manner by periodically applying a rotational torque to the movable mirrors; a driving circuit configured to control the rotation part; a circuit board having the driving circuit provided thereon, the circuit board being configured to support the movable mirrors as a unit; a contact plane contacting the circuit board in a plane perpendicular to the rotary shaft of the movable mirrors; and a positioning part configured to determine a position of the rotary shaft in the contact plane, wherein the movable mirrors have respective mirror surfaces apart from each other by a predetermined distance in a direction of the rotary shaft, and deflect the light beams emitted from the corresponding light sources in a same direction so as to scan the corresponding areas to be scanned.

According to one embodiment of the present invention, there is provided an image forming apparatus including an optical scanner configured to scan a photosensitive body, the optical scanner including the light deflector as set forth above; and a light source configured to emit a light beam deflected by the movable mirror.

According to one embodiment of the present invention, there is provided an image forming apparatus including an optical scanner configured to scan a photosensitive body, the optical scanner being either one of the optical scanners as set forth above.

According to a light deflector according to one embodiment of the present invention, there is no laying out of signal lines for controlling a rotation part, and it is possible to position the deflection point and the center position of amplitude of a movable mirror with reliability with respect to a light source unit and an imaging optical system that focuses a deflected light beam onto a scanned surface. Therefore, a scan position on the scanned surface is stably maintained, and the disposition of the movable mirror is maintained with good accuracy in combining multiple movable mirrors, so that it is possible to form a high-quality image. Further, by integrating a driving circuit, it is possible to preset circuit constants that match the peculiar vibration characteristics of the movable mirror module by module. Therefore, even if the movable mirror is replaced, it is possible to reproduce the same scan position on the scanned surface as before the replacement, so that it is possible to maintain the accuracy of scan position disposition between movable mirrors.

Further, according to an optical scanner according to one embodiment of the present invention, since the optical scanner includes a light deflector of the present invention, it is possible to achieve a uniform scanning speed on a scanned surface, so that it is possible to form an excellent image without variations in the distance between dots.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
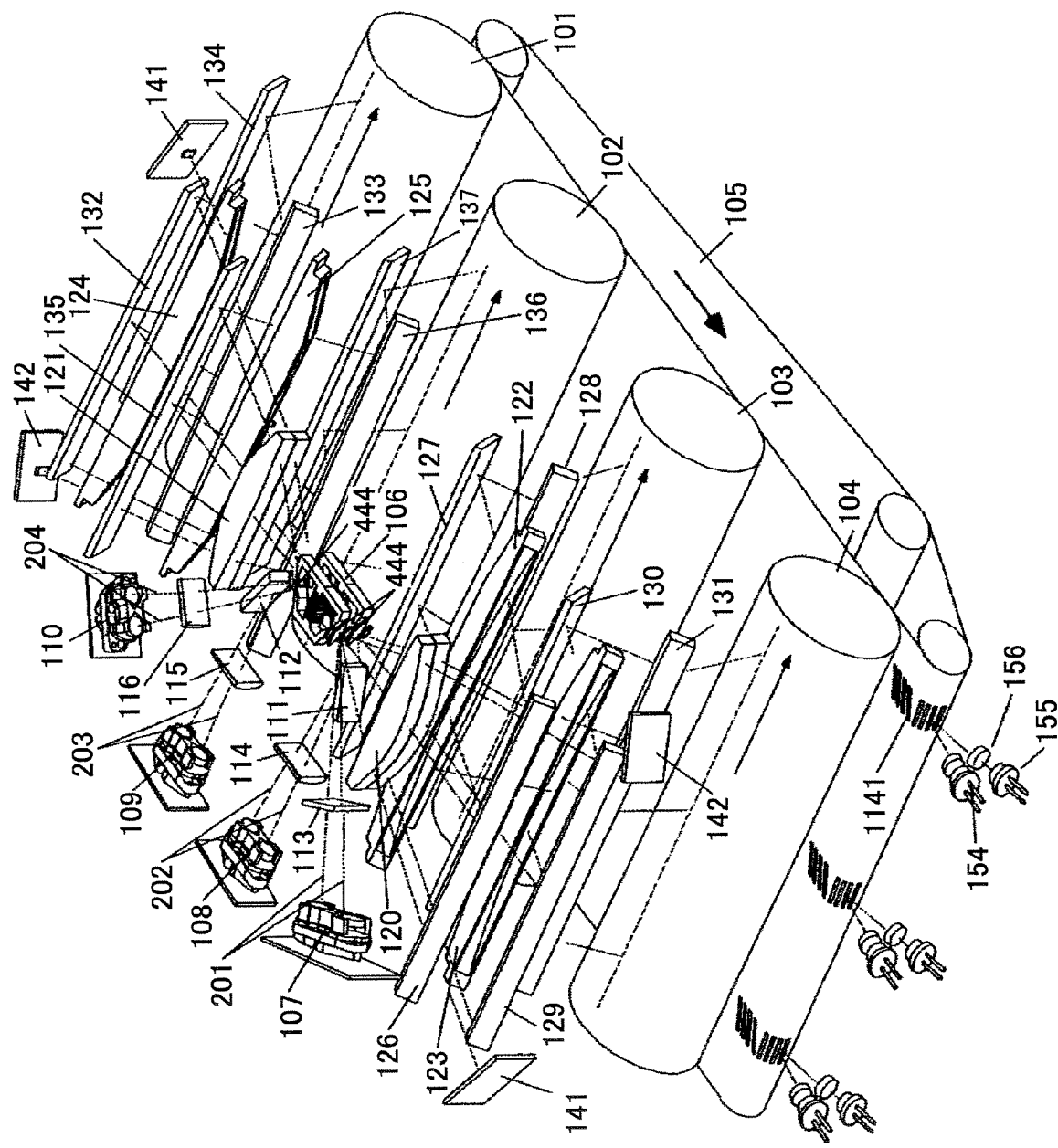
FIG. 1 is a perspective view of an optical scanner according to an embodiment of the present invention.

FIG. 1 is a perspective view of an optical scanner according to this embodiment. This optical scanner is provided in an electrophotographic image forming apparatus. The optical scanner performs scanning in four stations. The optical scanner employs an opposed scanning system in which the four stations are divided into two groups, two stations each, and light beams are made incident on a pair of moving mirrors from opposing sides thereof so as to be deflected in opposite directions and perform scanning.

Four photosensitive body drums 101, 102, 103, and 104 are disposed at equal intervals along a direction in which a transfer body such as paper moves (indicated by arrow in FIG. 1), so that toner images of different colors are successively transferred onto the transfer body so as to be superposed one over another, thereby forming a color image.

The optical scanner, which scans each of the photosensitive body drums 101, 102, 103, and 104, has a unitary configuration, and causes light beams to perform scanning using a vibrating mirror module 106, which is a light deflector.

The vibrating mirror module 106 is disposed in the center part of the optical scanner. The vibrating mirror module 106 has a pair of two-tier moving mirrors 440 each including upper and lower movable mirrors 441 joined at a predetermined distance from each other in the sub scanning direction. The vibrating mirror module 106 is disposed so that the mirror (reflecting) surfaces of the movable mirrors 441 of one and the other of the two-tier moving mirrors 440 are at an angle of 60° to each other.

Light source units 107 and 108 and light source units 110 and 109 are disposed symmetrically with respect to the vibrating mirror module 106 so that the light emission position of the light source unit 107 is vertically apart from that of the light source unit 108 by the distance between the mirror (reflecting) surfaces of the corresponding upper and lower movable mirrors 441; the light emission position of the light source unit 110 is vertically apart from that of the light source unit 109 by the distance between the reflecting surfaces of the corresponding upper and lower movable mirrors 441; and light beams 201 and 202 emitted from the light source units 107 and 108, respectively, and light beams 203 and 204 emitted from the light source units 109 and 110, respectively, are deflected in opposite directions. The amplitudes of the movable mirrors 441 are adjusted to be in phase with each other so that the light source units 107, 108, 109, and 110 simultaneously write respective images in the same scanning direction onto the photosensitive body drums 101, 102, 103, and 104 corresponding to yellow, cyan, magenta, and black.

Each of the light source units 107, 108, 109, and 110 includes a pair of semiconductor lasers so as to simultaneously scan two lines at each scanning time by performing scanning with an offset of one line pitch between the light beams in accordance with recording density in the sub scanning direction.

The light beams 201 and 204 emitted from the light source units 107 and 110, respectively, travel directly toward the corresponding movable mirrors 441 so as to be incident horizontally thereon at respective incident angles of 30° in the main scanning direction with respect to the normals of the corresponding movable mirrors 441. The light beams 202 and 203 emitted from the light source units 108 and 109, respectively, are deflected by corresponding incidence mirrors 111 and 112 so as to be incident horizontally on the corresponding movable mirrors 441 at respective incident angles of 30° in the main scanning direction with respect to the normals of the corresponding movable mirrors 441 with the same main scanning direction as the optical paths of the light beams 201 and 204, respectively.

As performed in the conventional optical scanner using a polygon mirror, the light beams 201, 202, 203, and 204 may be incident on the reflecting surfaces of the corresponding movable mirrors 441 either orthogonally or at a predetermined angle to the sub scanning direction.

Each of cylindrical lenses 113, 114, 115, and 116 has a flat surface on one side and a surface having a curvature in the sub scanning direction on the other side. The curvature in the sub scanning direction is common to the cylindrical lens 113, 114, 115, and 116. The cylindrical lens 113, 114, 115, and 116 are disposed so as to have the same optical path length up to the points of deflection of the corresponding movable mirrors 441. Each of the light beams 201, 202, 203, and 204 converges on the corresponding deflection surface into a linear shape in the main scanning direction. The light beams 201, 202, 203, and 204 are combined with below-described toroidal lenses 122, 123, 124, and 125, respectively, so as to cause the points of deflection and the corresponding surfaces of the photosensitive body drums 101, 102, 103, and 104 to be in conjugate relationships in the sub scanning direction, thereby forming a cross-scan error correction optical system that corrects tilt errors of the surfaces of the movable mirrors 441. Each of fθ lenses 120 and 121 has a unitary or joined structure of two layers corresponding to the distance between the reflecting surfaces of the corresponding upper and lower movable mirrors 441. In the main scanning direction, each of the fθ lenses 120 and 121 has a non-circular arc shape provided with power so as to have an f·arcsin characteristic in correspondence to the sine wave oscillation of the corresponding movable mirrors 441 of the vibrating mirror module 106. The fθ lenses 120 and 121 cause the light beams 201, 202, 203, and 204 to move at substantially uniform velocity on the surfaces of the photosensitive body drums 101, 102, 103, and 104 as the movable mirrors 441 of the vibrating mirror module 106 rotate. Further, with the toroidal lenses 122, 123, 124, and 125 disposed for the light beams 201, 202, 203, and 204, respectively, the fθ lenses 120 and 121 focus the light beams 201, 202, 203, and 204 into spots to record latent images on the surfaces of the photosensitive body drums 103, 104, 101, and 102, respectively.

According to this embodiment, the movable mirrors 441 of the vibrating mirror module 106 corresponding to the color stations are disposed so that the rotation axis of each movable mirror 441 coincides with the center of an image in the main scanning direction. Three reflector mirrors are disposed for each color station so as to have the same optical length between the movable mirrors 441 and the surfaces of the photosensitive body drums 101, 102, 103, and 104 and to have the same (relative) incident position and the same incident angle for the photosensitive body drums 101, 102, 103, and 104 disposed at equal intervals.

This is described following the optical path of each color station. The light beams 201 emitted from the light source unit 107 pass through the cylindrical lens 113 so as to be deflected by the corresponding upper movable mirror 441. Thereafter, the light beams 201 pass through the upper layer of the fθ lens 120 so as to be reflected from a reflector mirror 126. Then, the light beams 201 pass through the toroidal lens 122 so as to be reflected from reflector mirrors 127 and 128 and guided to the photosensitive body drum 103. Then, the light beams 201 form a cyan image on the photosensitive body drum 103 as the third station.

The light beams 202 emitted from the light source unit 108 pass through the cylindrical lens 114 so as to be reflected by the mirror 111 and deflected by the corresponding lower movable mirror 441. Thereafter, the light beams 202 pass through the lower layer of the fθ lens 120 so as to be reflected from a reflector mirror 129. Then, the light beams 202 pass through the toroidal lens 123 so as to be reflected from reflector mirrors 130 and 131 and guided to the photosensitive body drum 104. Then, the light beams 202 form a black image on the photosensitive body drum 104 as the fourth station.

The same applies to the second and first stations disposed symmetrically to the third and fourth stations with respect to the vibrating mirror module 106. The light beams 203 emitted from the light source unit 109 pass through the cylindrical lens 115 so as to be reflected by the mirror 112 and deflected by the corresponding lower movable mirror 441. Thereafter, the light beams 203 pass through the lower layer of the fθ lens 121 so as to be reflected from a reflector mirror 132. Then, the light beams 203 pass through the toroidal lens 124 so as to be reflected from reflector mirrors 133 and 134 and guided to the photosensitive body drum 101. Then, the light beams 203 form a yellow image on the photosensitive body drum 101 as the first station. Further, the light beams 204 emitted from the light source unit 110 pass through the cylindrical lens 116 so as to be deflected by the corresponding upper movable mirror 441. Thereafter, the light beams 204 pass through the upper layer of the fθ lens 121 so as to be reflected from a reflector mirror 135. Then, the light beams 204 pass through the toroidal lens 125 so as to be reflected from reflector mirrors 136 and 137 and guided to the photosensitive body drum 102. Then, the light beams 204 form a magenta image on the photosensitive body drum 102 as the second station. These components are retained in a single housing (not graphically illustrated) as a unit.

A detection part that detects the accuracy of registration of the color images formed in the stations and superposed is disposed at a roller part on the exit side of a transfer belt 105. This detection part detects main scanning registration and sub scanning registration as deviations from a reference station by reading toner image detection patterns 1141 formed on the transfer belt 105, thereby periodically performing correction control.

Specifically, the detection part includes a set of an LED device 154 for illumination, a photosensor 155 that receives reflected light, and a pair of condenser lenses 156 provided at each of the right end, center, and left end of an image in the direction in which the transfer belt 105 moves (indicated by arrow in FIG. 1). Thereby, as the transfer belt 105 moves, the detection part reads a difference in detection time (detection time difference) from black that is a reference color.

Figure 2:
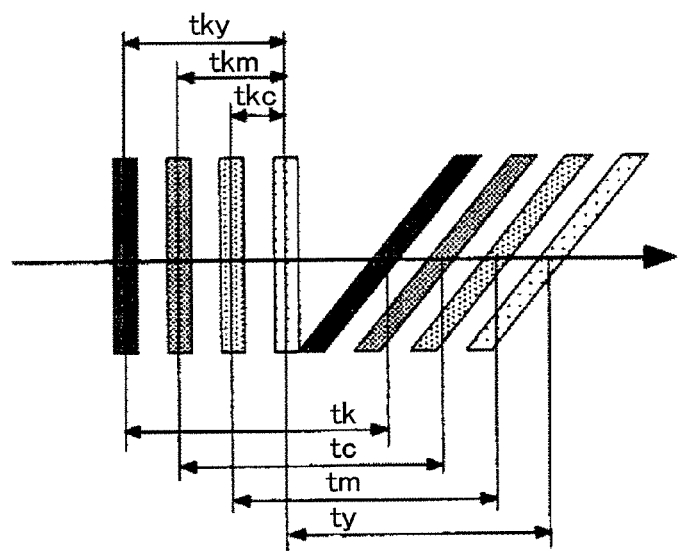
FIG. 2 is a plan view of a detection pattern according to the embodiment of the present invention.
Figure 3:
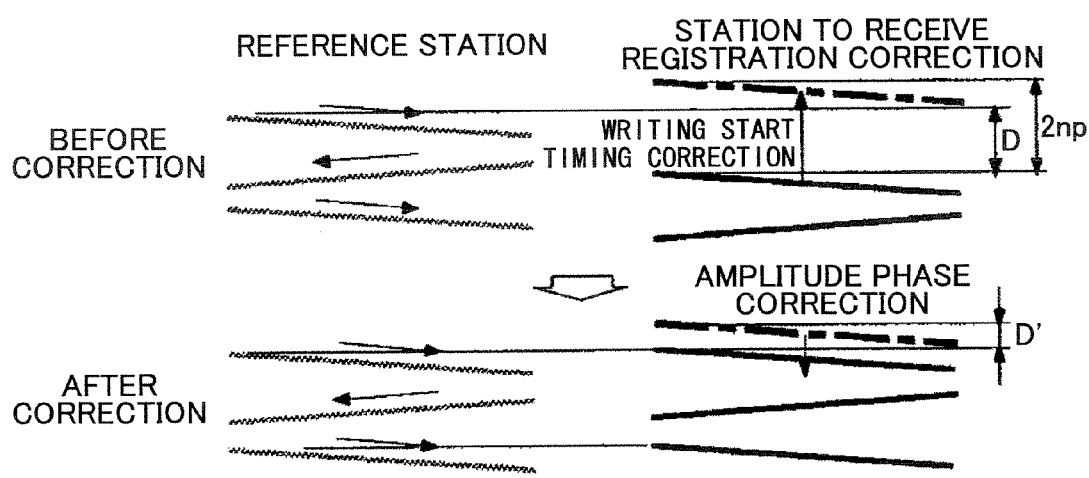
FIG. 3 is a diagram for illustrating adjustment of misregistration in the sub scanning direction according to the embodiment of the present invention.

FIG. 2 is a plan view of an example of the detection pattern 1141. The vertical directions on the plane of the paper correspond to the main scanning direction. The detection pattern 1141 of FIG. 2 includes a group of lines parallel to the main scanning direction and a group of lines inclined at 45° to the sub scanning direction. The lines of each group are formed in order of yellow, magenta, cyan, and black. The sub scanning registration deviation of each color can be determined from the difference between a corresponding one of detection time differences from black tky, tkm, and tkc and its theoretical value. The main scanning registration deviation of each color can be determined from the difference between a corresponding one of detection time differences tk, tc, tm, and ty and its theoretical value. With respect to main scanning registration, writing start timing of lines is synchronized. With respect to sub scanning registration, as shown in FIG. 3, writing start timing in the sub scanning direction is synchronized with respect to a registration deviation D using one cycle of the movable mirror 441, that is, 2n line pitch in the case of an n-beam light source, as a unit. An odd D' less than or equal to an n line pitch can be corrected by adjusting the amplitude phase of the corresponding movable mirror 441 as described below.

The main scanning magnification is corrected along with the amplitude correction of the movable mirrors 441. A change in the deflection angle of each movable mirror 441 is detected by detecting a scanning beam with a synchronization detection sensor 604 and a terminal detection sensor 605 (FIG. 10), thereby controlling an applied gain. Thereby, the deflection angle is varied and corrected.

Figure 4:
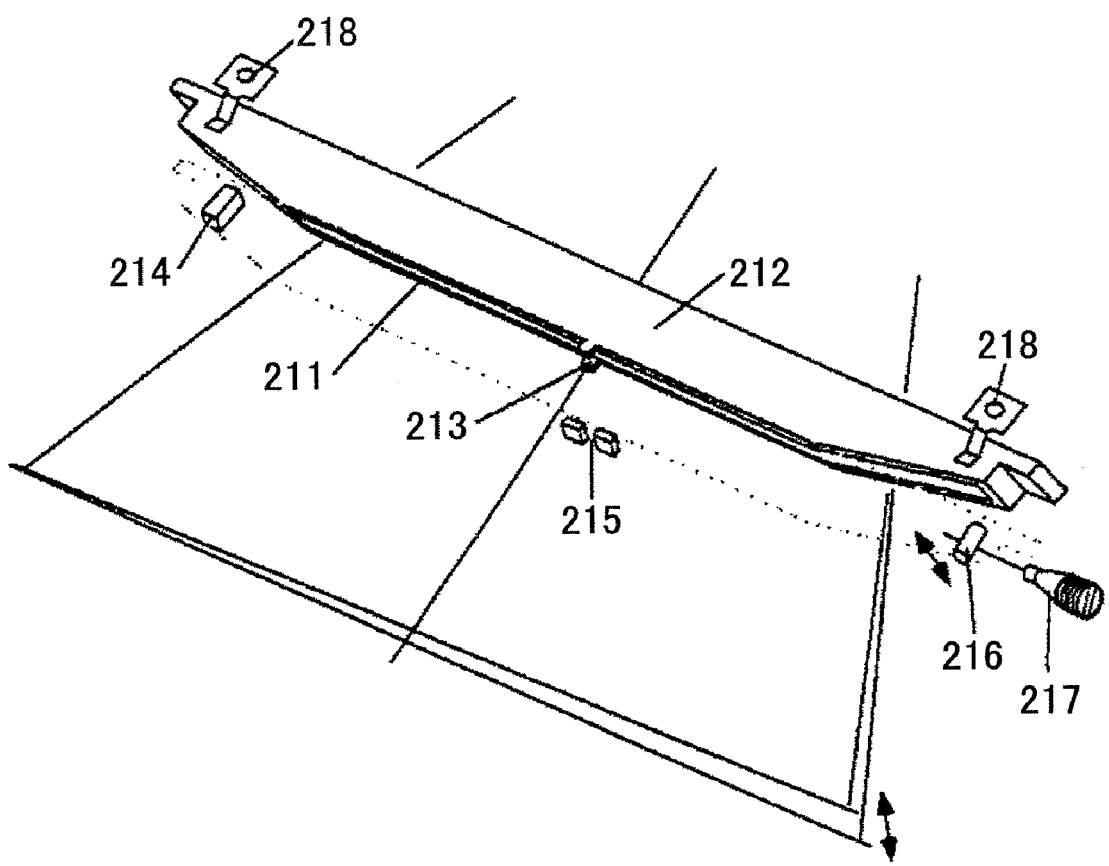
FIG. 4 is a diagram for illustrating the inclination of a scan line according to the embodiment of the present invention.

Further, the inclinations of scanning lines are equalized so that the scanning lines of a station other than a reference station are made parallel to those of the reference station by rotating a toroidal lens 211 in a plane perpendicular to the optical axis as shown in FIG. 4. The toroidal lens 211 has a frame part 212 provided so as to surround a lens part. The lens part 212 has a projection 213 formed unitarily thereon. The projection 213 determines the center position in the main scanning direction. A fixed support part 304 that supports the toroidal lens 211 by striking, in the sub scanning direction, one end thereof in the main scanning direction and a positioning part 215 that engages the projection 213 in the center part are provided on the bottom surface of the housing. The other end of the toroidal lens 211 is supported by a movable support part formed by a cylindrical member 216 and a tapered thread screw 217. The toroidal lens 211 is pressed and fixed with leaf springs 218. As the tapered thread screw 217 is turned, the cylindrical member 216 moves up or down, so that the inclination of the toroidal lens 211 can be changed. Since its focal line is also inclined, it is possible to change the inclinations of scanning lines.

Referring to FIG. 1, a board 141 for mounting the synchronization detection sensor 604 and a board 142 for mounting the terminal detection sensor 605 are provided for each of the pair of the first and second stations and the pair of the third and fourth stations, thereby detecting a light beam on the front side and the rear side of a scan area.

Figure 5:
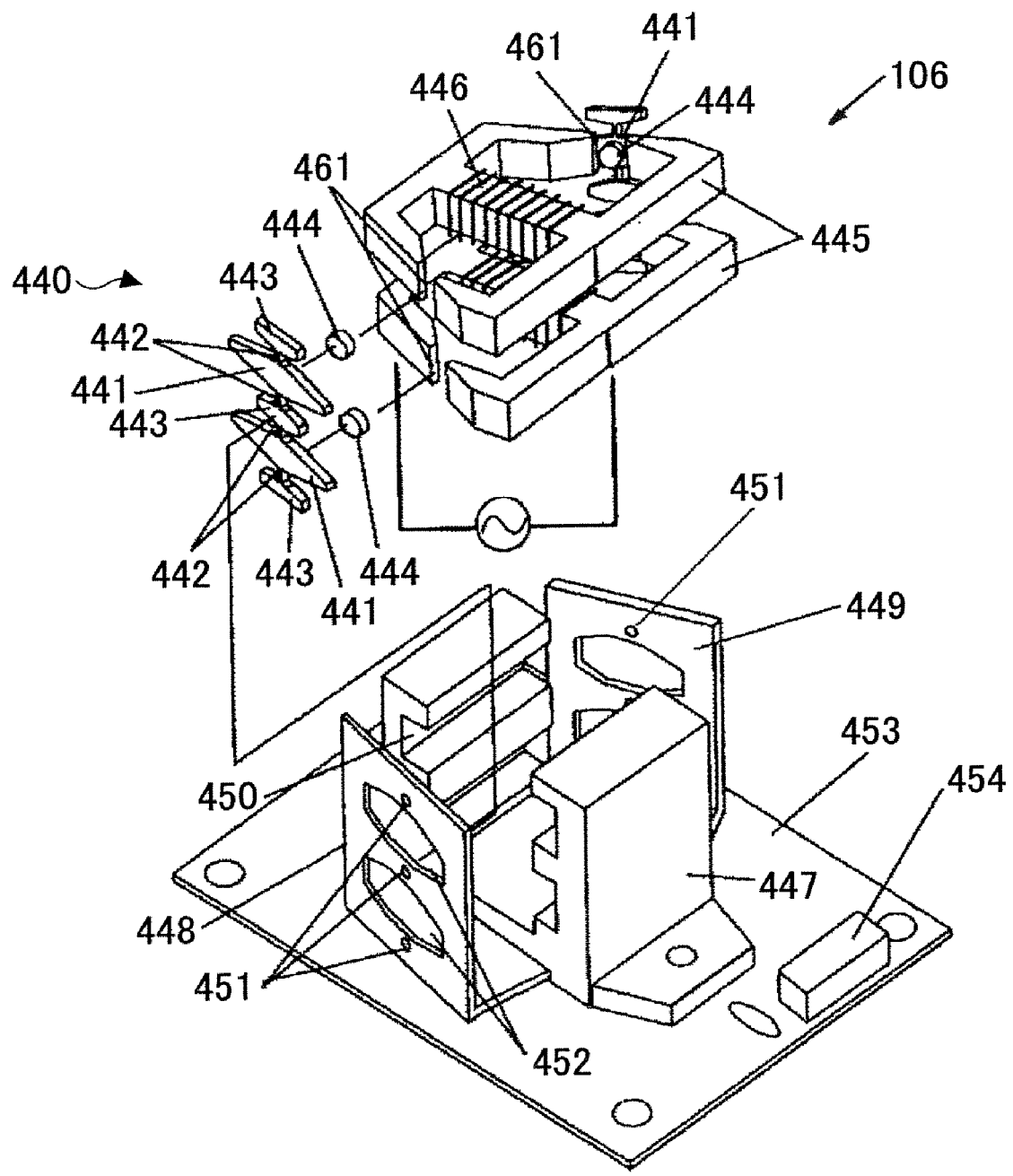
FIG. 5 is an exploded perspective view of a vibrating mirror module according to the embodiment of the present invention.

FIG. 5 is a detailed diagram showing the vibrating mirror module 106 employed in the optical scanner of this embodiment. In this embodiment, a description is given of an electromagnetic driving method as an example of means for applying rotary torque to the movable mirrors 441.

As shown in FIG. 5, each two-tier moving mirror 440 has its movable mirrors 441 formed in two tiers. The external shape of three anchor parts (fixed parts) 443 and a torsion beam 442 that connects the anchor parts 443 so as to serve as a rotary shaft are etched out from a single Si substrate (80 μm in thickness in this case), so that the movable mirrors 441, the anchor parts 443, and the torsion beam 442 are formed as a unit. As described above, the two two-tier moving mirrors 440 are disposed as a pair. In each two-tier moving mirror 440, the movable mirrors 441 are supported by a support member 447 with the three anchor parts 443 being joined to fixation points 451 of a corresponding one of raised and bent parts 448 and 449 of the support member 447 and their mirror (reflecting) surfaces exposed in openings 452 formed in the corresponding one of the raised and bent parts 448 and 449, so that the reflecting surfaces of the movable mirrors 441 of one of the two-tier moving mirror 440 are disposed at a predetermined angle ($\leq 90°$), 60° in this case, to the reflecting surfaces of the movable mirrors 441 of the other one of the two-tier moving mirror 440. The torsion beams 442 serving as rotary shafts are disposed parallel to each other with the movable mirrors 441 being supported by being joined to the fixation points 451. Hereinafter, the movable mirrors 441 joined to the raised and bent part 448 may also be referred to as "first movable mirrors 441" and the movable mirrors 441 joined to the raised and bent part 449 may also be referred to as "second movable mirrors 441" for convenience of description.

A core holding part 450 made of resin for holding fixed cores 445 one over the other in two tiers in correspondence to the reflecting surfaces of the upper and lower movable mirrors 441 is provided in the center part of the support member 447. Each fixed core 445 is attached by being fitted into corresponding recesses of the core holding part 450. The support member 447 thus formed is positioned at a predetermined position on a circuit board 453 and joined thereto.

Figure 6:
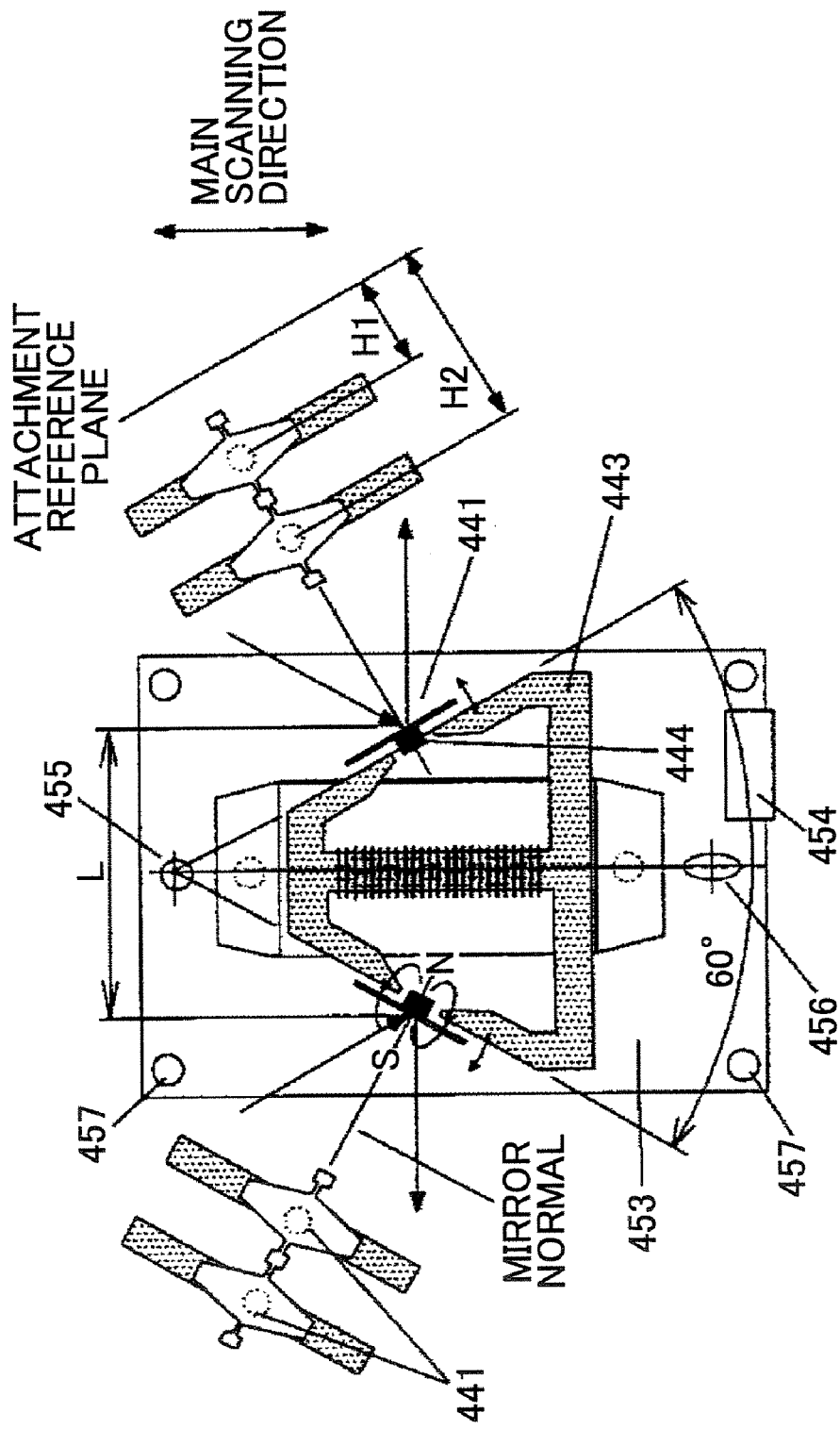
FIG. 6 is a plan view of the vibrating mirror module according to the embodiment of the present invention.

The circuit board 453 has a control IC for driving and a crystal oscillator mounted on an iron substrate. Power is supplied externally to the circuit board 453 through a connector 454. The circuit board 453 has its lower (bottom) surface serving as a reference plane. As shown in FIG. 6, which is a plan view of the vibrating mirror module 106, the circuit board 453 is provided on the housing (not graphically illustrated) with a reference hole 455, disposed at the intersection of the surface of each of the movable mirrors 441 and their axis of symmetry, and a sub reference hole 456 serving as a positioning reference (a positioning part). The circuit board 453 is screwed to the housing via through holes 457 in the four corners with the directions of the normals of the movable mirrors 441 being the same in the main scanning direction. That is, the reference hole 455 and the sub reference hole 456 serving as a positioning part determine the orientation of the mirror surface of each movable mirror 441. In this case, the movable mirrors 441 reflect the light beams 201 through 204 emitted from the light source units 107 through 110, respectively. Therefore, the reference hole 455 and the sub reference hole 456 determine the orientation of the mirror surface of each movable mirror 441 so that the reflecting surface of the upper first movable mirror 441 is positioned at the intersection of the optical axis line from the light source unit 107 and the optical axis of the upper layer of the fθ lens 120 (scanning lens); the reflecting surface of the lower first movable mirror 441 is positioned at the intersection of the optical axis line from the light source unit 108 and the optical axis of the lower layer of the fθ lens 120; the reflecting surface of the upper second movable mirror 441 is positioned at the intersection of the optical axis line from the light source unit 110 and the optical axis of the upper layer of the fθ lens 121 (scanning lens); and the reflecting surface of the lower second movable mirror 441 is positioned at the intersection of the optical axis line from the light source unit 109 and the optical axis of the lower layer of the fθ lens 121. That is, the reference hole 455 and the sub reference hole 456 determine the position of the rotation axis of each movable mirror 441 in a plane perpendicular to the rotation axis of the movable mirror 441 and determine the vertical position (height) of each movable mirror 441 from a contact plane, which is the surface of the housing on which the circuit board 453 is provided (attachment reference plane). In FIG. 6, H1 refers to the height of each lower movable mirror 441 and H2 refers to the height of each upper movable mirror 441 from the contact surface (attachment reference plane).

A cylindrical permanent magnet 444 is joined to the center of the rear side of the reflecting surface of each movable mirror 441, and is positioned by the support member 447 so as to be disposed in the center of a corresponding one of gaps 461 formed in the C-letter parts of the fixed cores 445. The end parts of each C-letter part on both sides of the corresponding gap 461 oppose each other in the main scanning direction with a predetermined distance being provided therebetween.

According to this embodiment, each of the (upper) fixed core 445 and the (lower) fixed core 445 opposing the reflecting surfaces of the upper and lower movable mirrors 441, respectively, of the two-tier moving mirror 440 that deflect light beams in opposite directions has a unitary structure. By energizing a coil 446 wound around the center part of each fixed core 445, magnetic flux is generated in each gap 461 so as to change the position of the corresponding permanent magnet 444 fixed to the corresponding movable mirror 441. Thereby, a rotary torque is exerted around each torsion beam 442 serving as a rotation axis. As a result, the torsion beams 442 are twisted so that the movable mirrors 441 are inclined.

Accordingly, by causing alternating current to flow through the coils 446, the direction of magnetic flux is caused to change over time, so that the movable mirrors 441 vibrate in a reciprocating manner. If a voltage at a frequency adjusted to the mechanical resonant frequency characteristic of the movable mirrors 441 is applied to the coils 446, the movable mirrors 441 are excited so that a large deflection angle can be obtained.

At this point, the directions of the magnetic fluxes are the same. Therefore, the first movable mirrors 441 and the second movable mirrors 441 vibrate with a phase difference of 180° therebetween so that if the first movable mirrors 441 rotate clockwise, the second movable mirrors 441 rotate counterclockwise. As a result, although the light beams are deflected in opposite directions, scanning can be performed in the same direction.

Figure 7:
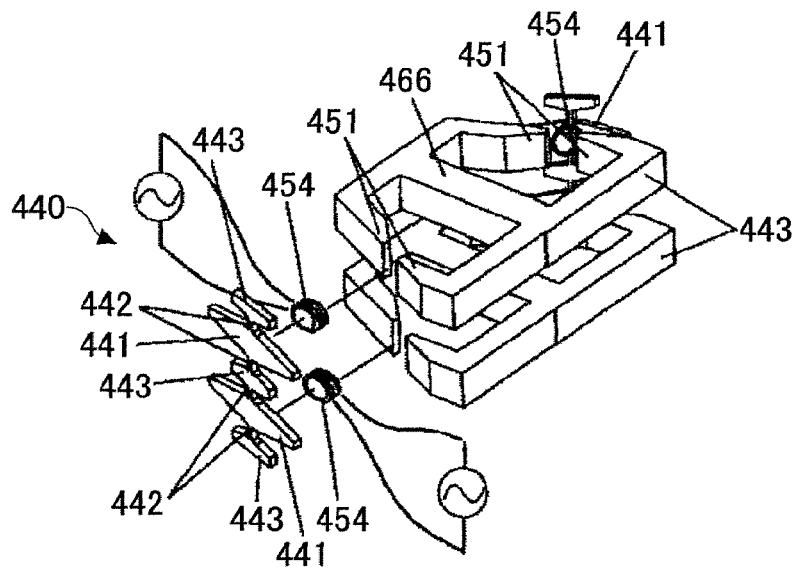
FIG. 7 is a perspective view of the vibrating mirror module for illustrating another configuration thereof according to the embodiment of the present invention.

In order to freely control the amplitude phase of each movable mirror 441, a coil 454 may be joined to the center of the rear side of the reflecting surface of each movable mirror 441, and a permanent magnet 466 may be provided in each fixed core 445 as shown in FIG. 7. Since each movable mirror 441 is formed of a Si substrate, the coil 446 may be formed on the rear side of each movable mirror 441 by patterning a metal thin film. The supporting method may be configured in the same manner as described above, and a description thereof is omitted.

Figure 8:
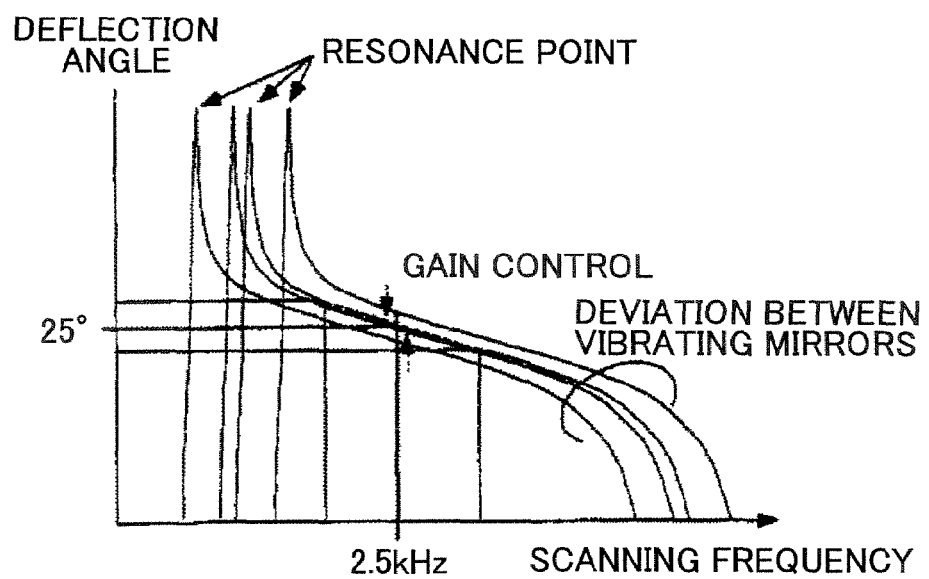
FIG. 8 is a graph showing the characteristic of a deflection angle with respect to a driving frequency according to the embodiment of the present invention.

FIG. 8 is a graph showing the characteristic of a deflection angle with respect to a driving frequency. FIG. 8 shows that the deflection angle can be maximized by the driving frequency equaling a resonant frequency, but that the deflection angle sharply changes around resonant frequencies.

Accordingly, the driving frequency to be applied to the fixed electrode can be set in the drive control part of each movable mirror 441 so as to be equal to a resonance frequency. However, there is a problem in that a change in the resonant frequency due to temperature change or the like causes a sharp decrease in the deflection angle, thus resulting in poor stability over time.

Conventionally, it is proposed to control the driving frequency so that the driving frequency follows a change in the resonant frequency. However, in the case of having the multiple movable mirrors 441, the resonance frequency characteristic of each movable mirror 441 varies independently to cause the above-described problem. Therefore, it is not possible to drive the movable mirrors 441 with separate driving frequencies.

Therefore, according to this embodiment, the driving frequency is in a frequency band that is near but excludes the resonant frequencies characteristic of the vibration part formed of the reflecting surfaces and the torsion beam 442 of each movable mirror 441; and in which a change in the deflection angle is relatively small. The driving frequency is determined as 2.5 kHz based on a resonant frequency of 2 kHz. The deflection angle is adjusted to ±25° by controlling the gain of applied voltage. At this point, it is preferable to set the driving frequency in a frequency band that does not include any resonant frequency even if there is a difference (300 Hz in this case) between the resonant frequencies of the vibration mirrors 441 due to processing error and there is a change (3 Hz in this case) in the resonant frequency due to temperature. If the resonant frequency is 2 kHz, the driving frequency may be higher than or equal to 2.303 kHz.

Figure 9:
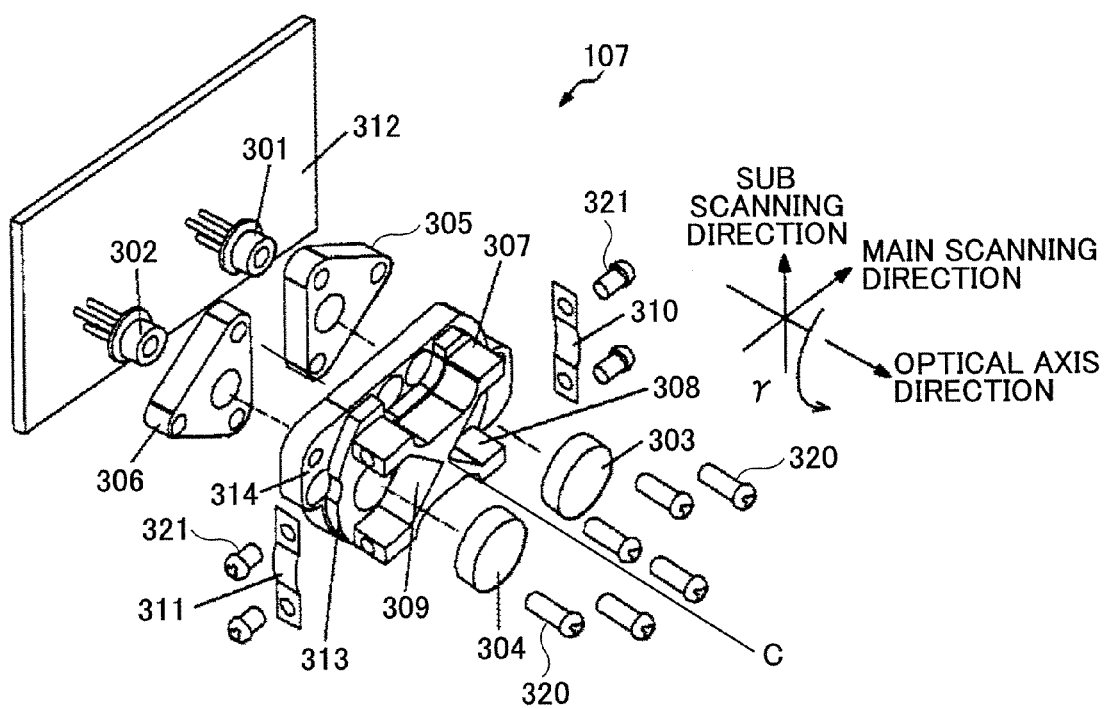
FIG. 9 is an exploded perspective view of a light source unit according to the embodiment of the present invention.

FIG. 9 is an exploded perspective view of the light source unit 107. Since the light source units 107, 108, 109, and 110 have the same configuration, a description is given herein of the light source unit 107.

The light source unit 107 includes semiconductor lasers 301 and 302 serving as light sources and coupling lenses 303 and 304. Each of the semiconductor laser 301 and the coupling lens 303 is disposed in symmetry in the main scanning direction with respect to the emission axis of the light beam of the semiconductor laser 301 and each of the semiconductor laser 302 and the coupling lens 304 is disposed in symmetry in the main scanning direction with respect to the emission axis of the light beam of the semiconductor laser 302 for each color scanning part. The exterior cylindrical surfaces of the packages of the semiconductor lasers 301 and 302 are press-fitted into the corresponding holes of base members 305 and 306, respectively, from their rear sides. Each of the base members 305 and 306 is screwed to a holder member 307, each with three screws 320 passing through the holder member 307 from its front side, so as to be held in contact with the rear side of the holder member 307. The coupling lenses 303 and 304 have their respective exterior cylindrical surfaces in contact with V-shaped groove parts 308 and 309, respectively, formed in the holder member 307 so as to be open in opposite directions, and are drawn inward by leaf springs 310 and 311 and fixed by screws 321. At this point, the disposition of the base member 305 on its surface of contact (contact plane) with the holder member 307 (a plane perpendicular to the optical axis of the light beam emitted from the semiconductor laser 301) and the disposition of the base member 306 on its contact plane with the holder member 307 (a plane perpendicular to the optical axis of the light beam emitted from the semiconductor laser 302) are adjusted so that the light emission points of the semiconductor lasers 301 and 302 are on the optical axes of the coupling lenses 303 and 304, respectively. Further, the V-shaped groove parts 308 and 309 and the exterior cylindrical surfaces of the coupling lenses 303 and 304 are adjusted so that light emitted from each of the coupling lenses 303 and 304 forms parallel rays. Thereby, the position of each of the coupling lenses 303 and 304 on the optical axis is adjusted and fixed.

The optical axis of the emitted light of each of the semiconductor lasers 301 and 302 is inclined to an emission axis C (the center axis of a cylindrical part 313) so that the emitted lights of the semiconductor lasers 301 and 302 are in such directions as to cross each other. In this embodiment, each of the base members 305 and 306 is fixed to the holder member 307 with the inclination of each of the base members 305 and 306 being determined so that this crosspoint (intersection) is near the reflecting surface of the corresponding movable mirror 441.

A printed board 312 having a driving circuit formed thereon is screwed to a base provided in a standing position on the holder member 307, and the lead terminals of each of the semiconductor lasers 301 and 302 are inserted into corresponding through holes and soldered. Thereby, the light source unit 107 is formed as a unit.

The light source unit 107 is positioned by inserting the cylindrical part 313 of the holder member 307 into an engagement hole formed in the wall surface of the housing with a different height, and is screwed to the housing with a contact plane 314 being in contact therewith. At this point, by adjusting an inclination γ with reference to the cylindrical part 313, it is possible to adjust a beam spot distance to a scan line pitch P according to recording density.

Figure 10:
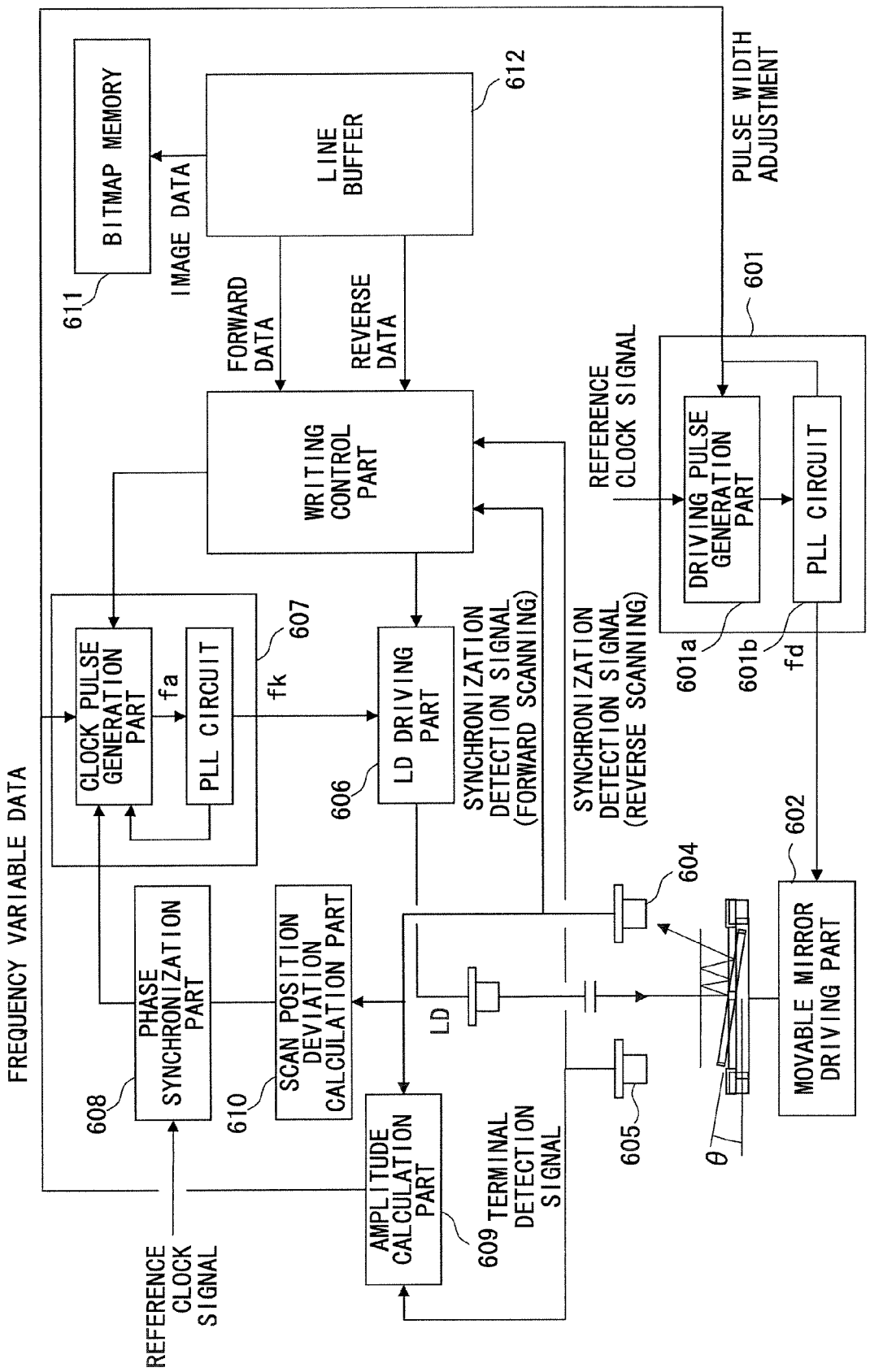
FIG. 10 is a circuit diagram showing a driving circuit according to the embodiment of the present invention.

FIG. 10 is a block diagram showing a driving circuit of the semiconductor lasers 301 and 302 formed on the printed board 312 and a driving circuit of the vibrating mirror module 106 formed on the circuit board 453.

In FIG. 10, image data are stored in a bitmap memory 611 with respect to each movable mirror 441, and are subjected to raster development for each of the semiconductor lasers (LDs) 301 and 302 so as to be stored in a buffer 612 as line data.

The stored line data are read out using a synchronization detection signal output from the synchronization detection sensor 604 as a trigger in forward scanning and using a synchronization detection signal output from the terminal detection sensor 605 as a trigger in reverse scanning, so that image recording is performed. At this point, the data order in forward scanning is reversed in reverse scanning. That is, a first buffer that outputs input data from their beginning and a second buffer that outputs input data from their end are provided, and the first and second buffers are switched so that the input data are read out alternately from the first and second buffers.

Figure 11:
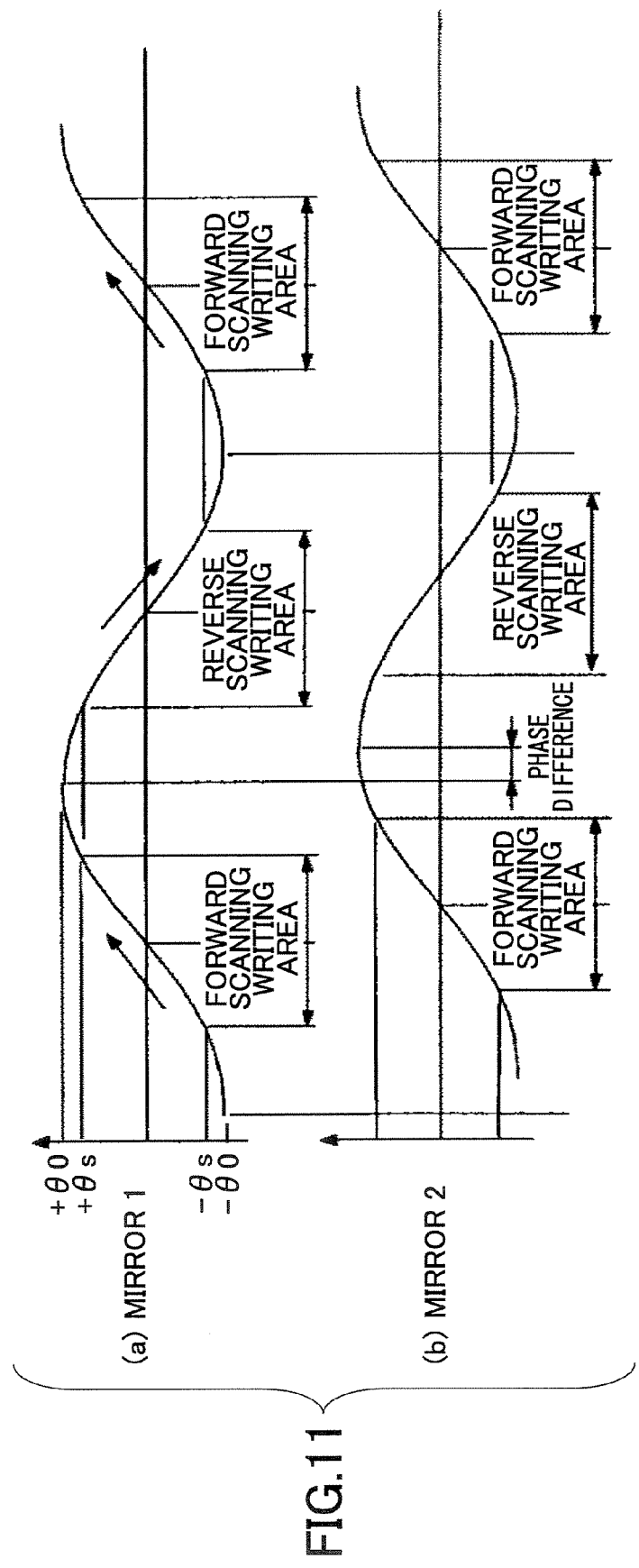
FIG. 11 is a graph for illustrating a phase lag of driving pulses generated in a driving pulse generation part and provided to the vibrating mirror module according to the embodiment of the present invention.

A driving pulse generation part 601 includes a pulse generation part 601a and a PLL circuit 601b. The pulse generation part 601a performs frequency division on a reference clock signal with a programmable frequency divider, and generates a pulse train so that voltage pulses are applied in timing with the amplitude of the movable mirrors 441 as described above. The pulse train is provided with a predetermined phase lag δ between the movable mirrors 441 as shown in FIG. 11 by the PLL circuit 601b, and is fed to a driving part 602 of each movable mirror 441 so that voltage is applied to each electrode.

Here, if the relative phase lag δ between the movable mirrors 441 is provided so as to satisfy:

$$\delta = (1/fd) \cdot \{(\Delta y/p) - n\}, \tag{1}$$

where p is one scan line pitch and n is a natural number satisfying $(\Delta y/p) - n < 1$, a registration deviation in the sub scanning direction is an integral multiple of one scan line pitch. Therefore, by performing writing start timing correction of every other cycle of the movable mirror 441, that is, by starting writing with an offset of n line cycles, the misregistration Δy in the sub scanning direction can be nullified, so that a high-quality image without color misregistration can be obtained.

As described above, a registration deviation is detected by forming a toner patch on the transfer belt 105. During this period of detection, however, a printing operation should be interrupted, so that toner is needlessly consumed. Accordingly, the frequency of the above-described correction is reduced, and the deviation during that period can be corrected by detecting a scanning beam.

Figure 12:
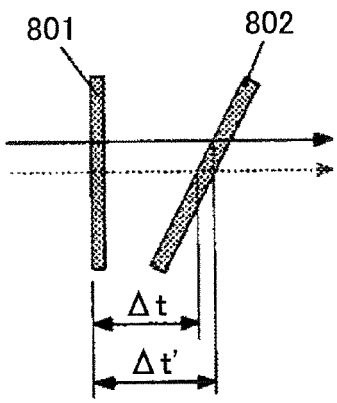
FIG. 12 is a diagram for illustrating the details of a detection part of a synchronization detection sensor or a terminal detection sensor according to the embodiment of the present invention.

FIG. 12 is a diagram showing the details of the detection part of each of the synchronization detection sensor 604 and the terminal detection sensor 605 therefor. The detection part has a photodiode 801 disposed perpendicularly to main scanning and a photodiode 802 that is not perpendicular to main scanning. When a light beam passes the edge of the photodiode 801, the detection part generates a synchronization detection signal or a terminal detection signal, and measures a time difference Δt, which is a time required for the light beam to reach the photodiode 802 from the photodiode 801. Thereby, it is possible to detect the scan position deviation in the sub scanning direction Δy, which is the main cause of the above-described misregistration, as a corresponding measurement on the photosensitive drum bodies 101, 102, 103, and 104

The scan position deviation in the sub scanning direction Δy is expressed as:

$$\Delta y = (V/\tan \gamma) \cdot \Delta t, \tag{2}$$

where γ is the inclination angle of the photodiode 802 (Δy sensor part) and V is the scanning speed of a light beam. If Δt is constant, this shows that there is no scan position deviation.

In this embodiment, the scan position deviation is detected by monitoring this time difference Δt in a scan position deviation calculation part 610, and is constantly fed back to the amplitude phase difference between the movable mirrors 441 so as to be corrected to match a Δt reference value.

The synchronization detection sensor 604 and the terminal detection sensor 605 are disposed on respective individual printed boards. The detection surfaces of the synchronization detection sensor 604 and the terminal detection sensor 605 are disposed at positions substantially equal to the optical path length to the surfaces of the photosensitive drums 101, 102, 103 and 104.

Basically, a driving voltage is applied to the vibrating mirror module 106 only during a period of image recording and a period of preparation therefor. At the time of turning on the vibrating mirror module 106 or starting the vibrating mirror module 106 in a standby state, the vibrating mirror module 106 is excited at a driving frequency fd that is caused to vary from the high frequency side by sequentially changing the frequency division ratio with a programmable frequency divider. Then, a light beam is detected by an amplitude detection part including the synchronization detection sensor 604 and the terminal detection sensor 605 disposed in the vicinity of where the scanning angle is −θ0. Then, a time difference T between the synchronization detection signal and the terminal detection signal is measured in an amplitude calculation part 609. Thereby, the maximum deflection angle (amplitude θ0) of the movable mirror 441 is detected.

The scan position deviation calculation part 610 detects the amplitude phase difference between the movable mirrors 441 based on the synchronization detection signals. A phase synchronization part 608 shifts the phase of the reference clock signal based on the detected amplitude phase difference so that writing in the main scanning direction is started at the same time, and feeds the reference clock signal to a pulse generation part 607. The pulse generation part 607 generates a varying pixel clock signal fm in order to make uniform the distance between the main scanning dots of pixels described below.

Here, θd/θ0 is given by:

$$\theta d/\theta 0 = \sin 2\pi \cdot fd \cdot t, \quad (3)$$

where θd is the scanning angle of a light beam detected by the sensor, t is a scan time from the image center (t=T/2), and fd is the driving frequency of the movable mirror 441.

The deflection angle is corrected by varying the gain of applied voltage pulses so that this time difference T reaches a predetermined reference value T0, thereby causing the movable mirrors 441 to have the same main scanning magnification as described above.

Figure 13:
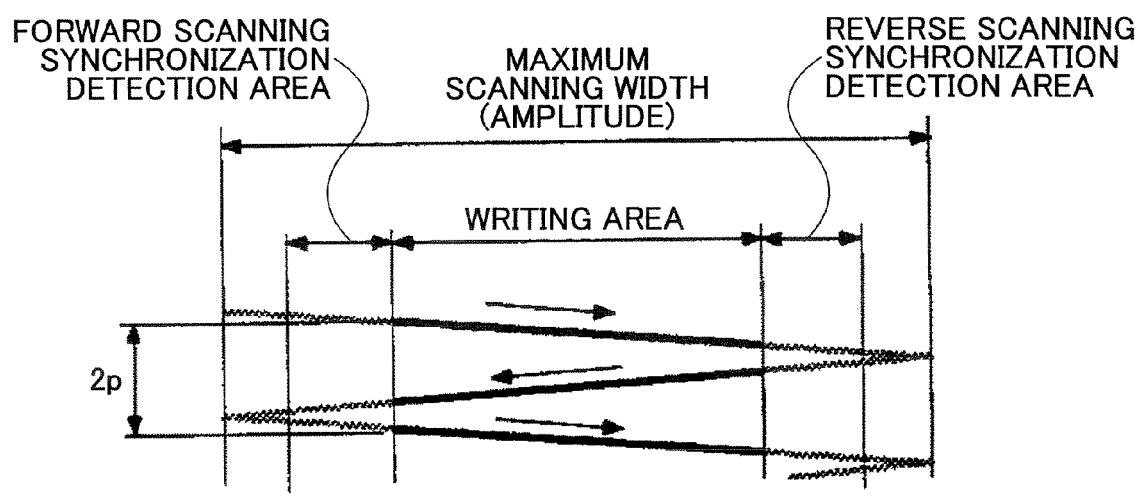
FIG. 13 is a diagram for illustrating employment of substantially one-half of a maximum deflection angle for image writing according to the embodiment of the present invention.
Figure 14:
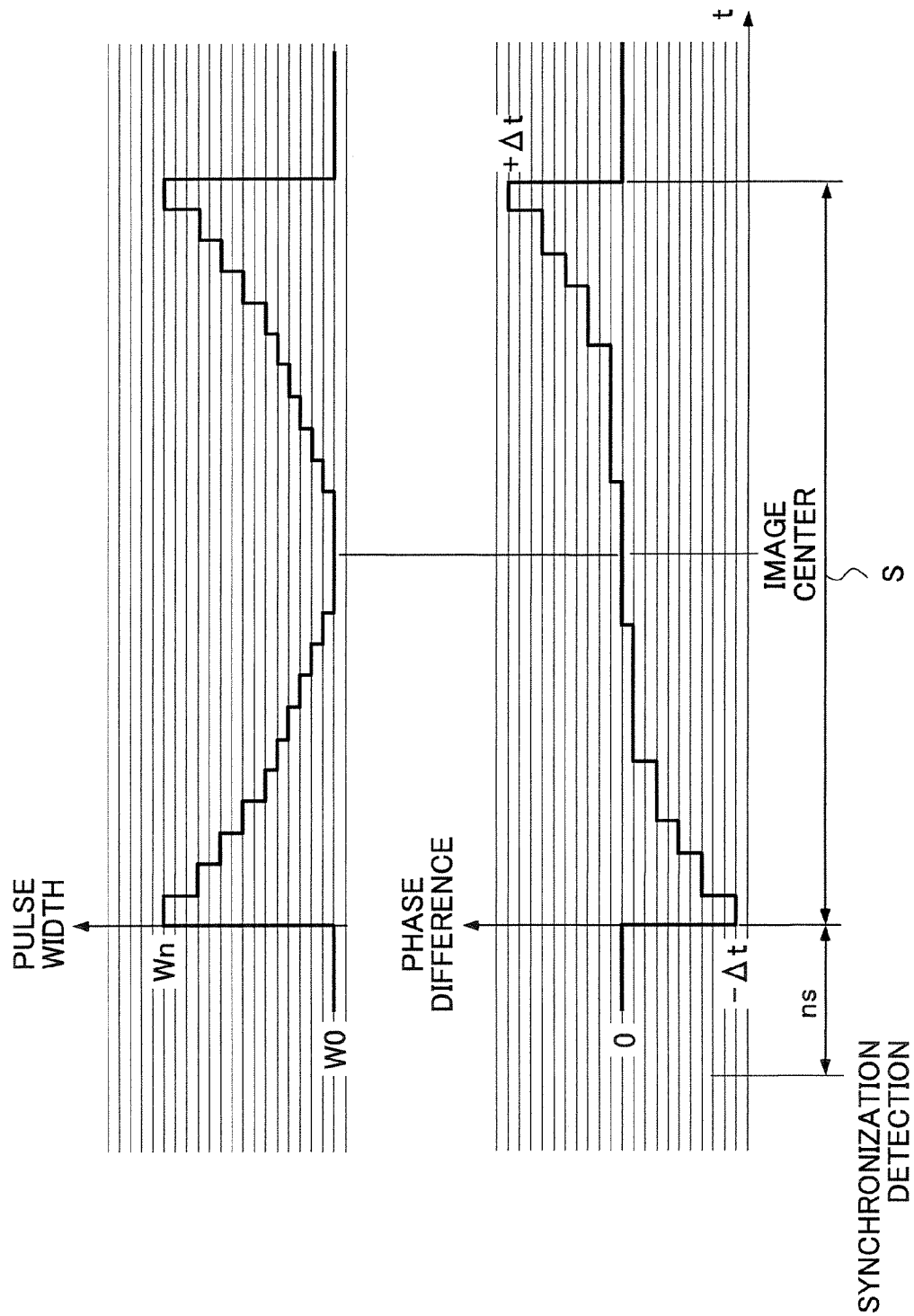
FIG. 14 is a diagram for illustrating a method of making uniform the distance between the main scanning dots of pixels with electrical correction according to the embodiment of the present invention.

The scanning angle θ of each movable mirror 441 varies sinusoidally since the movable mirror 441 is caused to vibrate by resonance. On the other hand, it is necessary to print main scanning dots at equal intervals on the surface of each of the photosensitive drum bodies 101, 102, 103, and 104, on which surface scanning is performed. The above-described scanning lens should have such imaging characteristics as to correct the orientation of light so that the scanning distance per unit scanning angle dH/dθ is proportional to sin(−1θ/θ0), that is, the light scanning is slow in the image center and becomes faster at an accelerating rate as the light moves toward the periphery. Therefore, a scanning lens whose power is distributed from the center to the periphery so that the image point becomes more distant is required. In this embodiment, uneven density due to non-uniform main scanning dot distance is made unnoticeable on an image using a conventional fθ lens by using an area where the scanning angle θ varies relatively linearly with respect to time, that is, substantially one-half of the maximum deflection angle (amplitude θ0) as shown in FIG. 13, for image writing and by causing the ratio of the effective scanning area (area to be scanned) θS to the amplitude θ0 (effective scanning rate) to be less than or equal to 50%. For this purpose, as shown in FIG. 14, the phase corresponding to each pixel, which is advanced at a writing start, is caused to be gradually delayed toward a writing end against a change in the scanning speed resulting from sine wave vibration, and the varying pixel clock signal fm is provided to an LD driving part 606 (FIG. 10) so as to gradually reduce a long pulse width at the writing start toward the image center and to increase the pulse width from the image center toward the writing end, thereby making uniform the distance between the main scanning dots of pixels with electrical correction.

Figure 15:
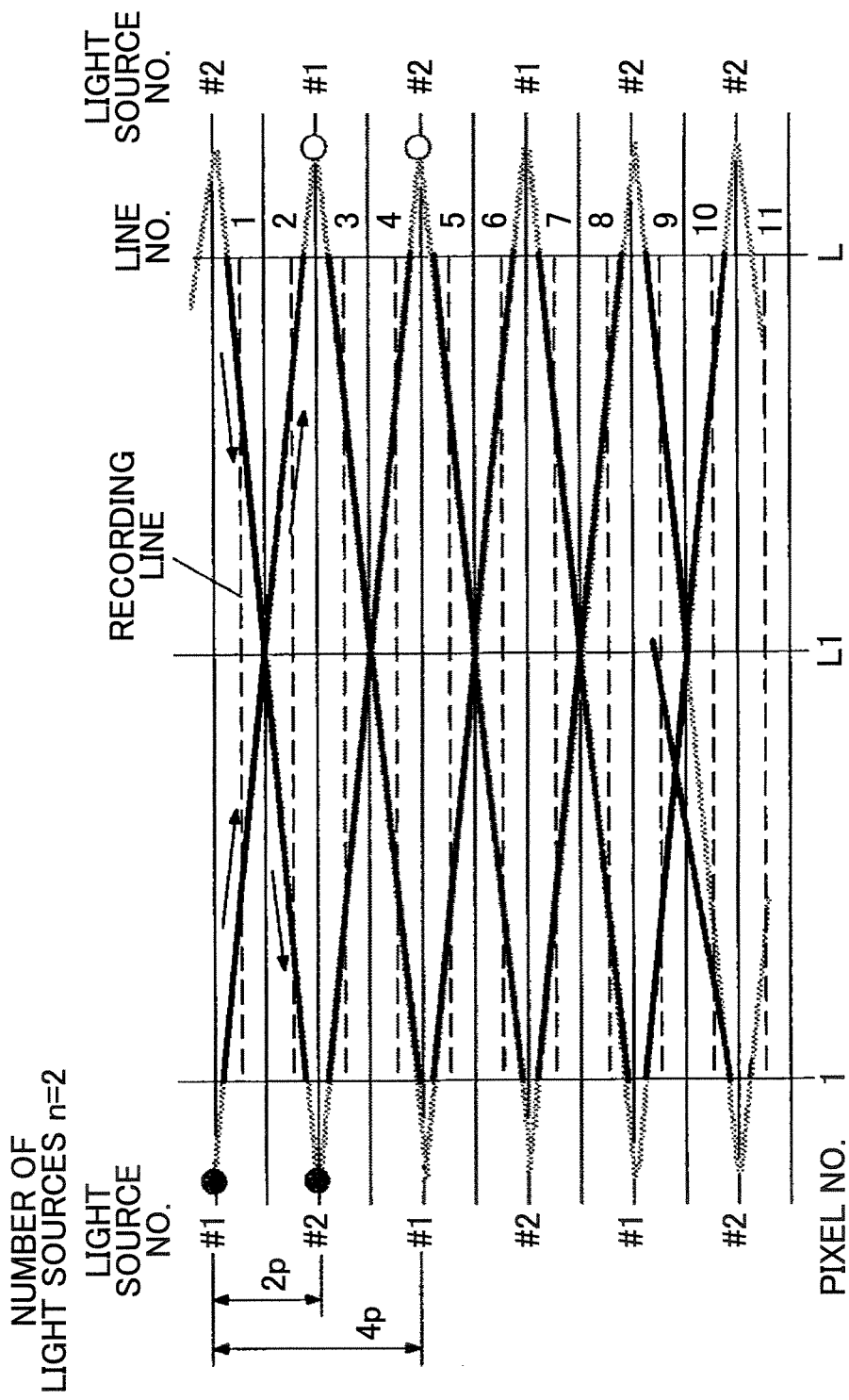
FIG. 15 is a diagram for illustrating a configuration of pixel dots with respect to each scan line according to the embodiment of the present invention.
Figure 16:
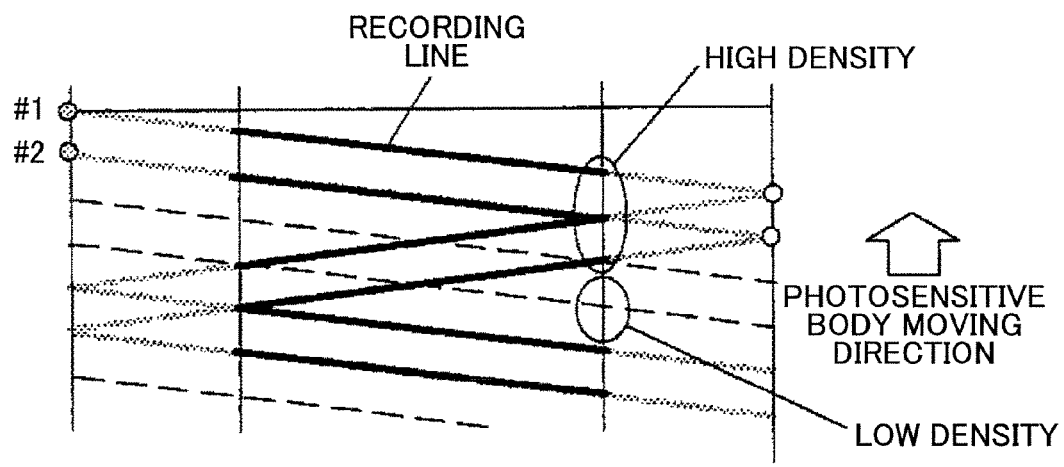
FIG. 16 is a diagram for illustrating the case of increasing the number of light emission sources in bidirectional scanning according to the embodiment of the present invention.

FIG. 15 is a diagram for illustrating a configuration of image dots for each scan line. Conventionally, it is known that in the case of forming an image by performing scanning only in one direction, it is possible to increase speed by performing simultaneous scanning with an increased number of light emission sources n. In the case of employing the movable mirrors 441, however, since it is possible to perform scanning back and forth, scanning in only one direction wastes a period of reverse scanning. However, increasing the number of light emission sources in bidirectional scanning increases the cycle of a zigzag as shown in FIG. 16, thus preventing dots from being formed at positions along a line to be recorded. This makes unevenness of density noticeable, thus causing a problem in that a high-quality image cannot be formed.

On the other hand, FIG. 15 shows a configuration of pixel data with respect to each recording line according to this embodiment. An image is recorded by sharing recording of image information corresponding to one line to be recorded between multiple light sources, thereby making unevenness of density unnoticeable even in bidirectional scanning.

The pitch between multiple beams on the surface of each of the photosensitive drums 101, 102, 103, and 104 is twice the line pitch P corresponding to recording density, and scanning is performed skipping 2nP lines every back-and-forth scanning of each movable mirror 441. That is, the recording rate is twice the recording rate in the conventional case of performing scanning only in one direction with a single beam.

Since n=2 in this embodiment, the pixels of a main scanning image area are divided into two groups: 1 through L1 and L1+1 through L, and the pixels 1 through L1 are recorded by the forward scanning of the light beam of a light source #1 and the pixels L1+1 through L are recorded by the reverse scanning of the preceding operation of the light beam of a light source #2, thereby forming the first line. The second line is formed by recording the pixels 1 through L1 by the reverse scanning of the preceding operation of the light beam of the light source #2 and by recording the pixels L1+1 through L by the forward scanning of the light beam of the light source #1. Thus, the data of each recording line indicated by a broken line are distributed to the light source #1 as part of the pixels to be recorded by its back-and-forth scanning and to the light source #2 as part of the pixels to be recorded by its back-and-forth scanning, so that an image is recorded in an upcurved and downcurved manner, using forward scanning and reverse scanning alternately in one line.

Accordingly, taking the configuration of data recorded by the light source #1 as an example, image recording is performed in the following order. First, the pixels 1 through L1 of the first line and the pixels L1+1 through L of the second line are recorded by forward scanning, and after the light beam is returned, the pixels L through L1+1 of the third line and the pixels L1 through 1 of the fourth line are recorded by reverse scanning.

This upcurved and downcurved unevenness is less than or equal to one line pitch, and is therefore not visually recognizable. Further, the number of light emission sources n is not limited to two. Even if the number of light emission sources n increases, the present invention is applicable in the same manner by increasing the number of divisions of the image area.

Figure 17:
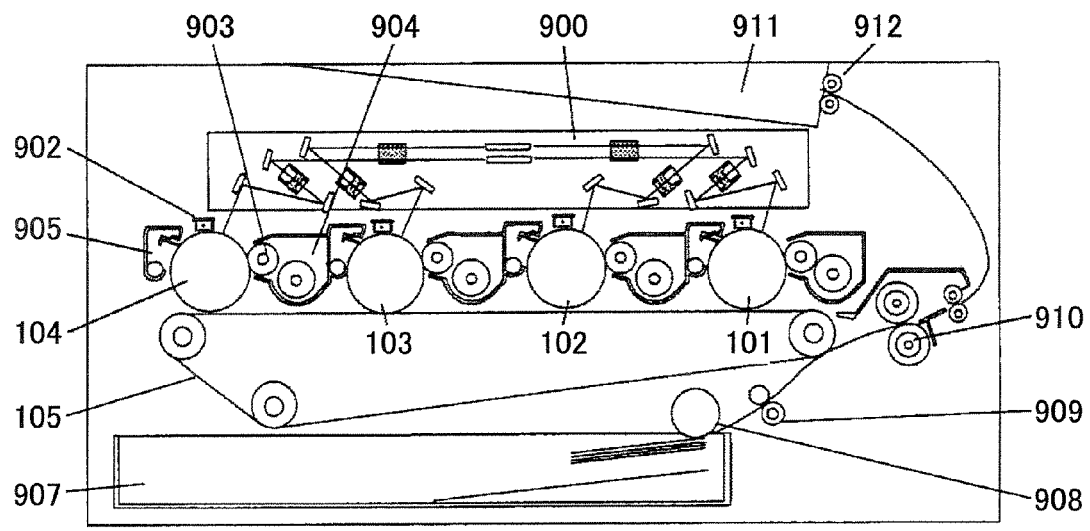
FIG. 17 is a schematic diagram showing an image forming apparatus according to the embodiment of the present invention.

FIG. 17 is a schematic diagram showing an electrophotographic image forming apparatus including the above-described optical scanner, which is referred to by reference numeral 900.

As shown in FIG. 17, a charger 902, a development roller 903, a toner cartridge 904, and a cleaning case 905 are disposed around the photosensitive drum body 104. (Here, a description is given of the photosensitive drum body 104 since each of the photosensitive drum bodies 101 through 103 has the same configuration as the photosensitive drum body 104.) The charger 902 charges the photosensitive drum body 104 with high voltage. The development roller 903 develops an electrostatic latent image recorded by the optical scanner 900 by adhering charged toner to the electrostatic latent image. The toner cartridge 904 supplies toner to the development roller 903. The cleaning case 905 scrapes off residual toner on the photosensitive drum body 104 and stores the scraped toner. As described above, image recording is performed on the photosensitive drum body 104 in multiple lines, five lines in this case, at the same time by single scanning by each movable mirror.

The above-described image forming stations are arranged in parallel in the moving direction of the transfer belt 105, and a yellow toner image, a magenta toner image, a cyan toner image, and a black toner image are successively timely transferred onto the transfer belt 105 so as to be superposed one over another to form a color image. The image forming stations have different toner colors but basically have the same configuration.

On the other hand, recording paper is fed from a paper feed tray 907 by a paper feed roller 908, and is timely sent out by a registration roller pair 909 for the start of recording in the sub scanning direction. The toner images are transferred onto the recording paper from the transfer belt 105, and are fixed onto the recording paper by a fixing roller 910. Then, the recording paper is output onto a paper output tray 911 by paper output rollers 912.

Figure 18:
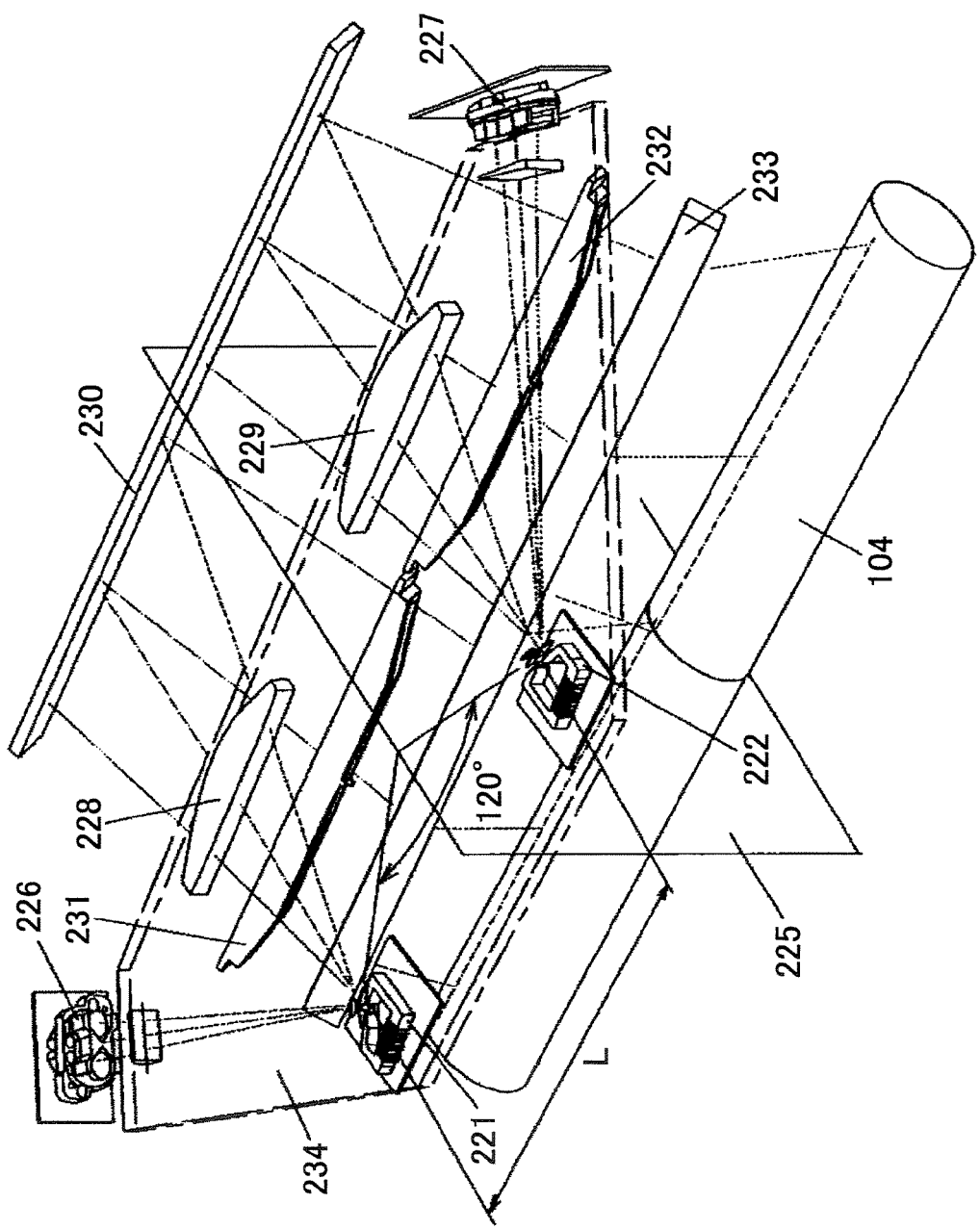
FIG. 18 is a diagram for illustrating a configuration where a main scanning area is divided into multiple areas and scanning is performed with a vibrating mirror module being provided for each of the divided areas according to the embodiment of the present invention.

FIG. 18 a diagram showing a configuration where a main scanning area is divided into multiple areas, and scanning is performed with a vibrating mirror module being provided for each divided area. In the case of FIG. 18, vibrating mirror modules 221 and 222 are provided for two divided areas. By thus recording divided images and forming a single image by joining the divided images, it is possible to reduce the optical path length and reduce the size of the optical system. In this configuration, each of the vibrating mirror modules 221 and 222 performs scanning for only one station and therefore has a single movable mirror. Alternatively, it is also possible to apply this configuration to four stations using the above-described vibrating mirror module 106 in place of each of the vibrating mirror modules 221 and 222.

The movable mirrors of the vibrating mirror modules 221 and 222 are disposed so as to form an angle of 120° with a division boundary plane 225 serving as an axis of symmetry, and deflect light beams emitted from light source units 226 and 227, respectively, in the same direction.

The deflected light beams pass through fθ lenses 228 and 229 so as to be reflected by a reflector mirror 230 to be incident on toroidal lenses 231 and 232, respectively. Then, the light beams are reflected by a reflector mirror 233 so as to scan corresponding areas of the photosensitive drum body 104.

Figure 19:
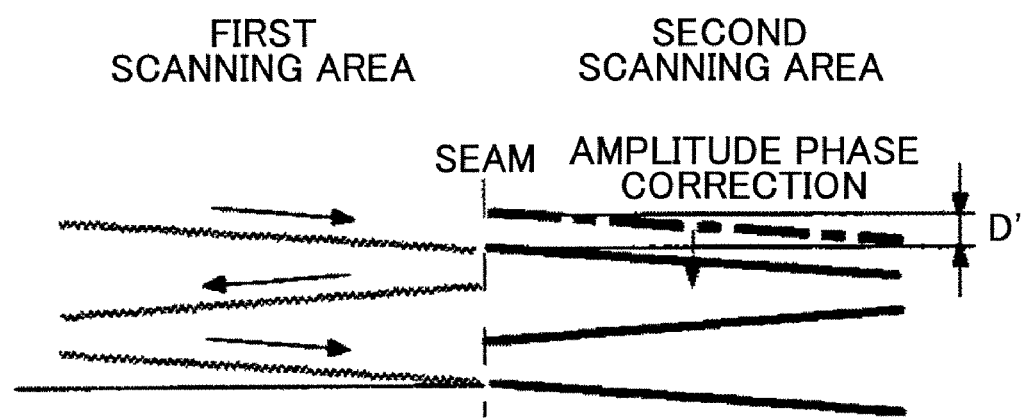
FIG. 19 is a diagram for illustrating correction of the seams of scan lines between optical scanners by adjusting the difference in amplitude phase between movable mirrors according to the embodiment of the present invention.

Each component is supported by a common base 234 so that the disposition of each component is maintained. At this point, as shown in FIG. 19, the seams of scan lines between optical scanners can be corrected by adjusting the amplitude phase difference between the movable mirrors in the same manner as in the case of the above-described sub scanning misregistration correction.

As described above, according to the vibrating mirror module 106 that is a light deflector according to this embodiment, there is no laying out of signal lines for controlling the coils 446 that are rotation parts, and it is possible to position the deflection point and the center position of amplitude of each movable mirror 441 with reliability with respect to a light source unit and an imaging optical system that focuses a deflected light beam onto a scanned surface (a surface to be scanned). Therefore, a scan position on the scanned surface is stably maintained, and the disposition of each movable mirror 441 is maintained with good accuracy in combining the movable mirrors 441, so that it is possible to form a high-quality image. Further, by integrating a driving circuit, it is possible to preset circuit constants that match the peculiar vibration characteristics of the movable mirrors 441 module by module. Therefore, even if any movable mirror 441 is replaced, it is possible to reproduce the same scan position on the scanned surface as before the replacement, so that it is possible to maintain the accuracy of scan position disposition between the movable mirrors 441.

Further, by including the vibrating mirror module 106, the optical scanner of this embodiment can realize a uniform scanning speed on a scanned surface so that an excellent image without variations in the distance between dots can be formed.

Further, according to the optical scanner of this embodiment, the multiple movable mirrors 441 are provided so that the rotation axis of the first movable mirrors 441 and the rotation axis of the second movable mirrors 441 are disposed apart from each other by a predetermined distance in a direction perpendicular to the main scanning direction. The first movable mirrors 441 and the second movable mirrors 441 reflect light beams emitted from corresponding semiconductor lasers (for example, the semiconductor lasers 301 and 302) that are light sources in respective directions opposite to each other so that the light beams scan multiple areas to be scanned. As a result, multiple areas to be scanned can be scanned at the same time and the disposition of each movable mirror 441 can be stably maintained with a single light deflector. Accordingly, the disposition accuracy of a scan line can be maintained on each scanned surface, so that a high-quality image without color misregistration or color change can be formed.

Further, according to the optical scanner of this embodiment, the rotation axis of the first movable mirrors 441 and the rotation axis of the second movable mirrors 441 are disposed parallel to each other, and the mirror surfaces of the first movable mirrors 441 and the mirror surfaces of the second movable mirrors 441 cross each other at a predetermined angle ($\leq 90°$). As a result, light beams emitted from semiconductor lasers (for example, the semiconductor lasers 301 and 302) can be directly made incident on the corresponding movable mirror 441 without the intervention of a reflector mirror. Accordingly, it is possible to ensure that the light beams are deflected on the rotation axis of the corresponding movable mirror 441, and it is possible to achieve a uniform scanning speed on a scanned surface. As a result, it is possible to form an excellent image without variations in the distance between dots.

Further, according to the optical scanner of this embodiment, the multiple movable mirrors 441 are coupled by the corresponding torsion beam 442 serving as a rotary shaft so as to be formed as a unit in each two-tier moving mirror 440. Accordingly, the movable mirrors 441 can be easily formed using a Si substrate or the like, and compared with the case of forming the movable mirrors 441 independent of one another, the difference in resonant frequency between the movable mirrors 441 can be reduced and it is possible to ensure that the directions of the normal of the movable mirrors 441 coincide with each other. Accordingly, the accuracy of the disposition of a scan line is maintained on each scanned surface, so that it is possible to form a high-quality image without color misregistration or color change.

Further, according to the optical scanner of this embodiment, by causing each movable mirror 441 to vibrate in a reciprocating manner at a common scanning frequency, it is possible to make uniform the distance between scan lines in the sub scanning direction on the scanned surfaces. Accordingly, it is possible to form a high-quality image without color misregistration or color change.

Further, according to the optical scanner of this embodiment, the phase of the scanning frequency at which each movable mirror 441 is caused to vibrate in a reciprocating manner is variable, so that it is possible to adjust a scan position on each scanned surface with the amount of adjustment of one scan line or less. Accordingly, it is possible to ensure prevention of misregistration in the sub scanning direction, so that it is possible to form a high-quality image without color misregistration or color change.

Further, according to the optical scanner of this embodiment, by supporting the vibrating mirror module 106 and the semiconductor lasers 301 and 302 on the common substrate 234, it is possible to stably maintain the range of the vibration of a scanning beam by the movable mirror 441 with respect to a scanning area (an area to be scanned) on the scanned surface. Accordingly, it is possible to ensure prevention of misregistration in the main scanning direction, so that it is possible to form a high-quality image without color misregistration or color change.

Further, according to the optical scanner of this embodiment, by detecting the vibration of each movable mirror 441 and controlling rotational torque based on the detection result, it is possible to detect and correct a variation in the vibration due to a change in temperature. Accordingly, a scanning area on the scanned surface, that is, a so-called main scanning magnification, is stably maintained, so that it is possible to form a high-quality image without color misregistration or color change.

Further, according to the optical scanner of this embodiment, by detecting a light beam deflected by the movable mirror 441, it is possible to correct a variation in the vibration of the movable mirror 441 and a deviation in main scanning magnification resulting from a change in the temperature of an imaging optical system at the same time, so that it is possible to form a high-quality image without color misregistration or color change.

Further, it is possible to form an image forming apparatus that produces the above-described effects by employing the optical scanner of this embodiment in the image forming apparatus.

According to one embodiment of the present invention, there is provided a light deflector including a movable mirror serving as a deflector supported by a rotary shaft and configured to deflect a light beam emitted from a light source and scan an area to be scanned; a rotation part configured to cause the movable mirror to vibrate in a reciprocating manner by periodically applying rotational torque to the movable mirror; a driving circuit configured to control the rotation part; a circuit board having the driving circuit provided thereon, the circuit board being configured to support the movable mirror as a unit; a contact plane contacting the circuit board in a plane perpendicular to the rotary shaft of the movable mirror; and a positioning part configured to determine the position of the rotary shaft in the contact plane.

According to one embodiment of the present invention, there is provided an optical scanner including multiple light sources each configured to emit a light beam; and a light deflector, the light deflector including multiple movable mirrors serving as deflectors each supported by a rotary shaft and configured to deflect the light beam emitted from a corresponding one of the light sources and scan an area to be scanned; a rotation part configured to cause the movable mirrors to vibrate in a reciprocating manner by periodically applying a rotational torque to the movable mirrors; a driving circuit configured to control the rotation part; a circuit board having the driving circuit provided thereon, the circuit board being configured to support the movable mirrors as a unit; a contact plane contacting the circuit board in a plane perpendicular to the rotary shafts of the movable mirrors; and a positioning part configured to determine the position of each of the rotary shafts in the contact plane, wherein the rotary shafts of the movable mirrors are disposed so as to be apart from each other by a predetermined distance in a direction perpendicular to a main scanning direction; and the movable mirrors deflect the light beams emitted from the corresponding light sources in opposite directions so as to scan the corresponding areas to be scanned.

According to one embodiment of the present invention, there is provided an optical scanner including multiple light sources each configured to emit a light beam; and a light deflector, the light deflector including multiple movable mirrors serving as deflectors each supported by a rotary shaft common to the movable mirrors and configured to deflect the light beam emitted from a corresponding one of the light sources and scan an area to be scanned; a rotation part configured to cause the movable mirrors to vibrate in a reciprocating manner by periodically applying a rotational torque to the movable mirrors; a driving circuit configured to control the rotation part; a circuit board having the driving circuit provided thereon, the circuit board being configured to support the movable mirrors as a unit; a contact plane contacting the circuit board in a plane perpendicular to the rotary shaft of the movable mirrors; and a positioning part configured to determine the position of the rotary shaft in the contact plane, wherein the movable mirrors have respective mirror surfaces apart from each other by a predetermined distance in a direction of the rotary shaft, and deflect the light beams emitted from the corresponding light sources in the same direction so as to scan the corresponding areas to be scanned.

According to one embodiment of the present invention, there is provided an image forming apparatus including an optical scanner configured to scan a photosensitive body, the optical scanner including the light deflector as set forth above; and a light source configured to emit a light beam deflected by the movable mirror.

According to one embodiment of the present invention, there is provided an image forming apparatus including an optical scanner configured to scan a photosensitive body, the optical scanner being either one of the optical scanners as set forth above.

The present invention is not limited to the specifically disclosed embodiment, and variations and modifications may be made without departing from the scope of the present invention.

The present application is based on Japanese Priority Patent Applications No. 2005-336404, filed on Nov. 21, 2005, and No. 2006-212643, filed on Aug. 3, 2006, the entire contents of which are hereby incorporated by reference.

What is claimed is:

1. A light deflector, comprising:
    a movable mirror serving as a deflector supported by a rotary shaft and configured to deflect a light beam emitted from a light source and scan an area to be scanned;
    a rotation part configured to cause the movable mirror to vibrate in a reciprocating manner by periodically applying a rotational torque to the movable mirror;
    a driving circuit configured to control the rotation part;
    a circuit board having the driving circuit provided thereon;
    a contact plane contacting a surface of the circuit board in a plane perpendicular to the rotary shaft of the movable mirror; and
    a positioning part configured to support the movable mirror so that the rotary shaft is perpendicular to the surface of the circuit board and to determine a position of the rotary shaft in the contact plane.

2. The light deflector as claimed in claim 1, wherein the positioning part determines an orientation of a mirror surface of the movable mirror in the contact plane.

3. The light deflector as claimed in claim 1, wherein the positioning part determines a vertical position of the movable mirror from the contact plane.

4. An optical scanner, comprising:
    the light deflector as set forth in claim 1; and
    the light source configured to emit the light beam deflected by the movable mirror.

5. The optical scanner as claimed in claim 4, wherein the light deflector and the light source are supported by a same base.

6. The optical scanner as claimed in claim 4, further comprising:
    an amplitude detection part configured to detect an amplitude of the movable mirror,
    wherein the driving circuit controls the rotational torque based on at least a result of the detection.

7. The optical scanner as claimed in claim 6, wherein the amplitude detection part comprises a beam detection part configured to detect the light beam deflected by the movable mirror.

8. An image forming apparatus, comprising:
    an optical scanner configured to scan a photosensitive body,
    the optical scanner including:
        the light deflector as set forth in claim 1; and
        the light source configured to emit the light beam deflected by the movable mirror.

* * * * *